Figure 1:
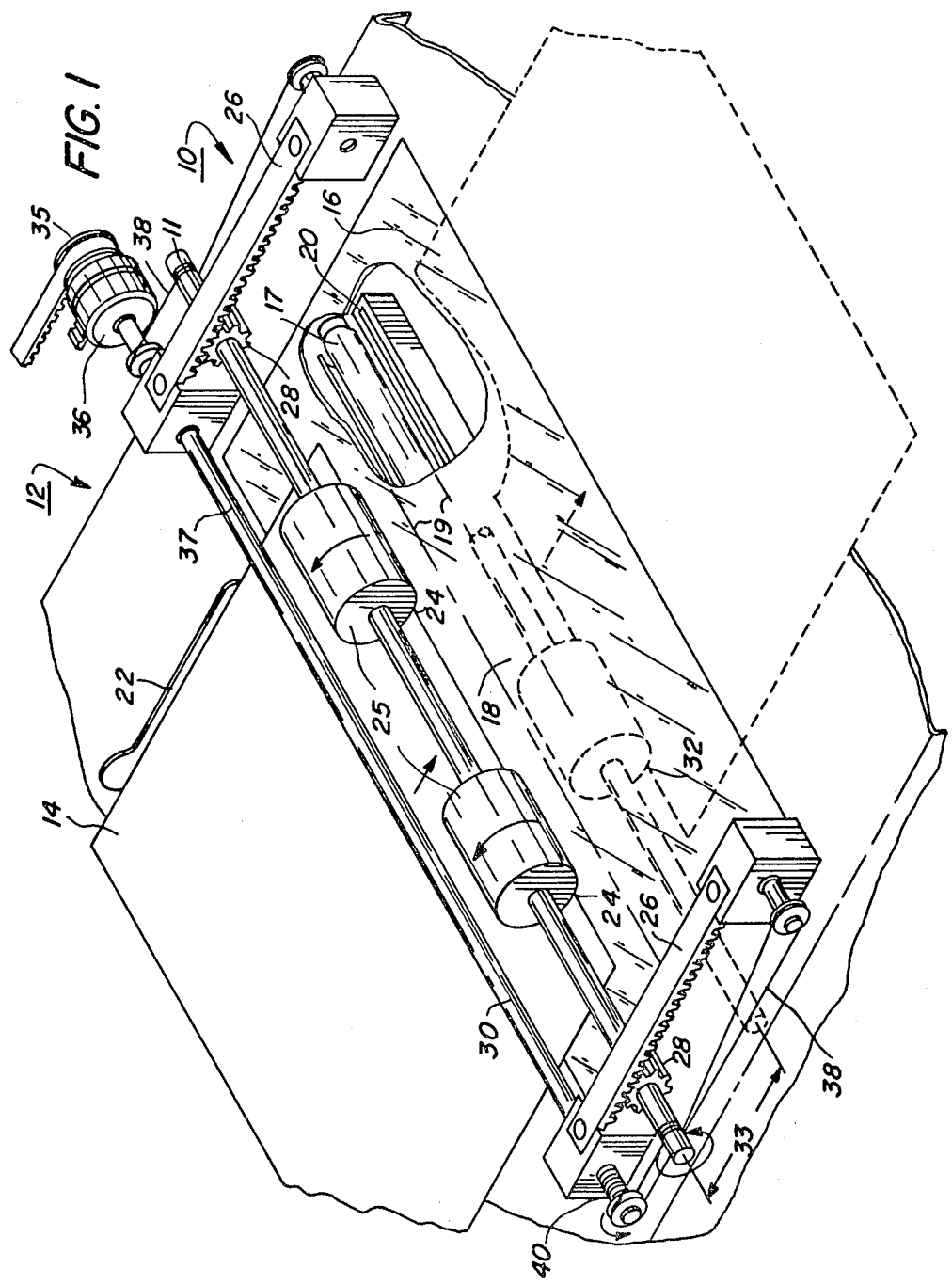

United States Patent [19]

Castro-Hahn

[11] 4,429,866
[45] Feb. 7, 1984

[54] MOVING NIP CONSTANT VELOCITY DOCUMENT TRANSPORT

[75] Inventor: Victor Castro-Hahn, Fairport, N.Y.

[73] Assignee: Xerox Corporation, Stamford, Conn.

[21] Appl. No.: 315,791

[22] Filed: Oct. 28, 1981

[51] Int. Cl.³ .............................................. B65H 5/12
[52] U.S. Cl. .................................... 271/266; 271/267; 355/14 SH
[58] Field of Search .............................. 271/266, 267; 355/14 SH; 226/152, 156, 148, 162

[56] References Cited

U.S. PATENT DOCUMENTS

| | | | |
|---|---|---|---|
| 2,973,610 | 3/1961 | Randall | 271/107 X |
| 3,373,851 | 3/1968 | Baer | 192/30 |
| 3,536,320 | 10/1970 | Derby | 271/50 |
| 3,900,258 | 8/1975 | Hoppner et al. | 355/51 |
| 3,977,777 | 8/1976 | Tanaka et al. | 355/1 |
| 4,017,172 | 4/1977 | Lynch | 355/8 |
| 4,048,782 | 9/1977 | Hamilton | 226/156 X |
| 4,062,061 | 12/1977 | Batchelor et al. | 364/900 |
| 4,076,408 | 2/1978 | Reid et al. | 355/14 |
| 4,078,787 | 3/1978 | Berlew et al. | 271/3.1 |
| 4,099,860 | 7/1978 | Connin | 355/14 |
| 4,125,325 | 11/1978 | Batchelor et al. | 355/26 |
| 4,132,401 | 1/1979 | Gauronski et al. | 271/245 |
| 4,144,550 | 3/1979 | Donohue et al. | 364/107 |
| 4,158,500 | 6/1979 | DiFrancesco et al. | 355/14 |
| 4,176,945 | 12/1979 | Holzhauser et al. | 355/23 |
| 4,179,215 | 12/1979 | Hage | 355/50 |
| 4,229,101 | 10/1980 | Hamlin et al. | 355/77 |
| 4,257,587 | 3/1981 | Smith | 271/236 |
| 4,278,344 | 7/1981 | Sahay | 355/14 |
| 4,284,270 | 8/1981 | Silverberg | 271/166 |

OTHER PUBLICATIONS

Japanese Utility Model Application No. 54-15480 Laid Open Jun. 18, 1981 as No. 56-74455 by Olympus Optical Co., Ltd.

Primary Examiner—Richard A. Schacher

[57] ABSTRACT

In a document transport 10 for transporting an original document sheet 14 over the imaging station 18 of a copier 12 there is disclosed a single integrally movable roller unit 11 solely engaging and driving a document sheet over the platen from an initial position 24 upstream of the imaging station to a document ejection position 32 downstream thereof with driving means 35 both rotating and translating the roller unit relative to the platen to translate the roller unit 11 and a document sheet held and transported thereunder over and through the imaging station without imaging the roller unit or rubbing the platen glass in the imaging area. The disclosed roller unit 11 reciprocates a distance 33 from and back to the initial position 24 with pinion gears 28 on the roller shaft 30 engaging racks 26 to control the combined rotational and translational movement of the transport wheels 25 in the transporting movement direction. Clutch release of the rollers may be provided in the return movement.

8 Claims, 2 Drawing Figures

MOVING NIP CONSTANT VELOCITY DOCUMENT TRANSPORT

An original document sheet transport for moving documents with a constant velocity over the transparent copying window of a copier with a single document transport unit which both rotates and translates across the copying window.

Especially for the faster xerographic and other document copiers now in commercial use, it is increasingly desirable to provide for the automatic handling of the individual original document sheets being copied, in order to more fully utilize the higher speed copying capabilities of these copiers. It is desirable to semi-automatically or automatically feed, register and copy document sheets of a variety or mixture of sizes, types, weights, materials, conditions and susceptibility to damage, yet with minimal document jamming, wear or damage by the document transporting and registration apparatus.

Even with slower copying rate copiers, it has become increasingly desirable to provide at least semi-automatic document handling, allowing an operator to "stream feed" originals into an input of the copier document handler, with the document handler doing the fine registration and feeding of the documents into and through the copying position, and then ejecting the documents automatically. However, in compact low cost copiers, the appropriate document handler must also be simple, low cost and compact.

Such a document handling system is preferably one which utilizes an existing or generally conventional copier optical imaging system, including the external transparent copying window (known as the platen) of the copier. It is also desirable that the document handling system be readily removable to alternatively allow the copier operator to conventionally manually place documents, including books, on the same copying platen. Thus, a light weight document handler is desirable.

A manual copying registration position is conventionally provided by a fixed raised registration edge or edges extending linearly along one or two sides of the platen, fixed to the copier body or fixed along one or two edges of the platen glass. It is desirable for the automatic document handler to automatically register or maintain the document sheet at such an existing or conventional manual registration position.

One of the most important, and difficult to achieve, requirements for automatic or semi-automatic document handling is the accurate and reliable, but safe, transporting and registration of the original document relative to the proper registration position for copying. If the document is not properly registered, or slips after registration or during copying, it will be misaligned relative to the copy. Thus undesirable dark borders and/or edge shadow images may appear on the ensuing copy, and information at edges of the document may not be copied.

The type of document transport and registration system is affected by the type of copier optics, i.e. the copying system. In the wellknown constant velocity transport (CVT) system a moving document is copied with a stationary optics system. The document sheet is moved by transport wheels or belts at a constant velocity over a narrow transparent scanning window or platen of a copier. This is desirable for a small copier since the overall system can be much more compact. However, the CVT system can also be combined in a copier alternatively providing a full size stationary platen, i.e. using only part of the full platen to provide for alternative document CVT for "stream feeding" input, or for CVT feeding documents which are larger than the platen, e.g. the Xerox "3100 LDC" copier (see e.g. U.S. Pat. Nos. 3,900,258 and 4,017,172).

A CVT with a book carrier with rack and pinion drive is disclosed in Japanese Utility Model Application No. 54-15480 laid open June 18, 1981 as No. 56-74455 by Olympus Optical.

It is generally preferable in such a CVT system to preregister the document to its transport just beform the document is transported over the copying window. Examples are disclosed in the above patents or in U.S. Pat. No. 3,536,320 issued Oct. 27, 1970 to D. R. Derby.

In contrast, in many other copying systems or modes, the document is registered overlying a full document sized (full frame) platen, and either optically scanned by moving optics while it is held stationary over the platen, or optically stopped by flash illumination and imaging of the entire document when the document is driven by the document handler, feed wheels or belts to the registration position over the platen. Some examples are cited below.

The present invention is not limited to any particular or specific type of document illumination or optics system. However, it is particularly suitable for providing a constant velocity moving document transport or CVT system.

CVT systems have a particular problem with maintaining the velocity of the document constant. If the document speed during imaging is not constant relative to the photoreceptor the copy image will have skips, smears or stretched or compacted image areas, as noted in U.S. Pat. No. 4,017,172 cited above. With dual transport wheel units on opposite sides of the image area, as is typically used, differences in velocity therebetween or differences as the document moves out from under one of the two transports, are known to cause such problems. In one such known type with two transport wheel pair nips, one of the nips is between the first set of rollers and the platen glass, whereas the other nip is between the other set of rollers and idler rollers. This tends to change the document velocity when the document enters the second nip, because when a fixed rubber roll is rubbing against the glass it needs a high driving torque, (e.g. about 2 in.-lb. without a document), whereas the same rollers only need a driving torque of about 0.2 in.-lb. when the document enters that nip, since the document sheet can slide with much lower friction than the roller on the glass. This sudden change of driving torque, as a document enters an over-platen nip, tends to change the document velocity.

Mounting the document transport stationarily directly over the imaging area is undesirable unless it is a large uninterrupted belt, because wheels can cause shadows at the edges of the copy and can put scratches in or abrade the platen glass in the imaging area, since such a feeder must rotate with frictional slippage directly against the glass before and after each document is fed and tends to pick up abrasive materials from the document paper, etc.

The prior art also includes various other patents teaching document handlers and also control systems therefor, such as U.S. Pat. Nos.: 4,062,061; 4,076,408; 4,078,787; 4,099,860; 4,125,325; 4,132,401; 4,144,550;

4,158,500; 4,176,945; 4,179,215; 4,229,101; 4,278,344 and 4,284,270.

Conventional simple software instructions in the copier's general microprocessor logic circuitry and software of document handler and copier control functions and logic, as taught by the above and other patents and various commercial copiers, is well known and preferred, and is not a part of this invention. However, it will be appreciated that the document transport functions and controls described herein may be alternatively conventionally incorporated into a copier utilizing any other suitable or known simple software or hard wired logic systems, cam-bank switch controllers, etc. With the present system, both document transport and copying thereof can be initiated simply by a known document lead edge detector switch actuated as the document sheet is inserted or fed from an upstream stack separator/feeder. See, e.g. the above-cited U.S. Pat. No. 4,132,401, issued Jan. 2, 1979 to J. F. Gauronski et al. and the references cited therein.

All references cited are also incorporated by reference herein for appropriate teachings of additional or alternative details, features, and/or technical background.

The present invention overcomes or minimizes various of the above-discussed problems. A preferred feature of the invention disclosed herein is to provide, in a document transport apparatus for transporting an original document sheet over the imaging station at a transparent platen of a copier, the improvement comprising integrally movable roller unit means adapted to driving engage a document sheet on said platen from an initial position upstream of said imaging station, and driving means to both rotate and translate said roller unit means relative to said platen and in engagement with a document sheet and so as to translate said roller unit means and a document sheet thereunder over and through said imaging station.

Further features which may be provided by the document transport system disclosed herein include said an integral roller unit means providing a single nip line roller engagement with a document sheet which is the only driving force on a document sheet in said imaging station, or the driving means including means to reciprocate said roller unit means from and back to said initial position, or said driving means comprising a fixed rack means extending past said imaging station in the document movement direction and pinion gear means rotatably engaging said rack means and rotatably connecting with said roller unit means and means to drive said roller unit means, the roller unit means comprising a single shaft with aligned rubber rollers thereon, or wherein said roller unit means has a one way clutch means to allow free reverse rotation thereof in non-slip engagement with said platen on a return movement to said initial portion, or wherein the rotational movement of said roller unit means advances the lead edge of a document ahead of it before it enters the imaging station.

Further features and advantages of the present invention pertain to the particular apparatus and steps whereby the above-mentioned features or advantages may be attained.

Figure 2:
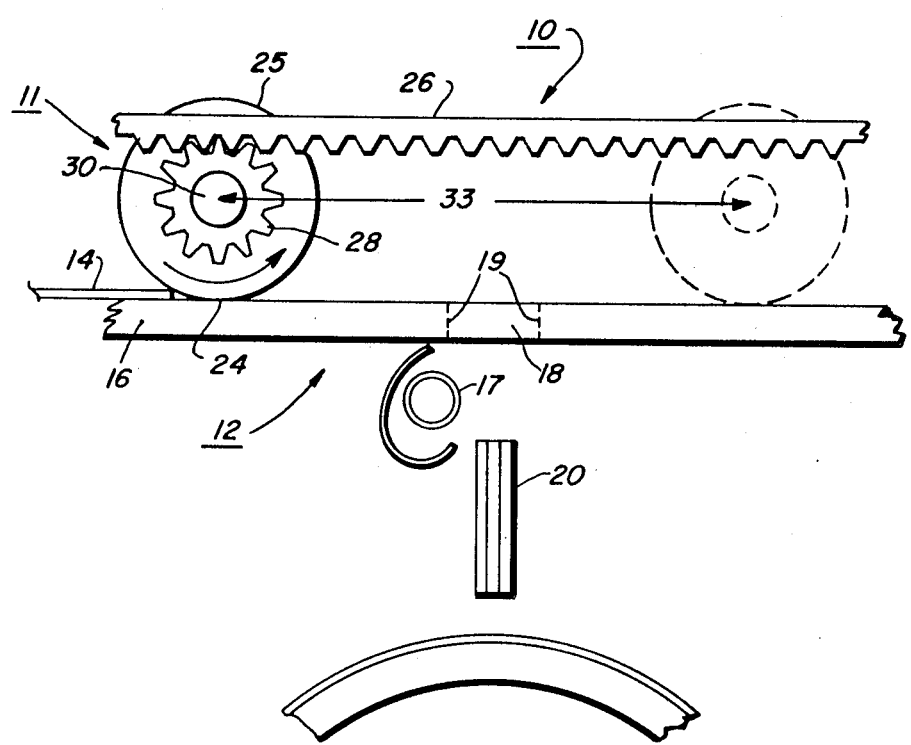

The invention will be better understood by reference to the following description of specific examples thereof, which includes the following drawing figures (approximately to scale) wherein:

FIG. 1 is a partial perspective top view of an exemplary copier showing an exemplary document handling apparatus in accordance with the present invention; and FIG. 2 is an enlarged partial side view of the apparatus of FIG. 1.

Referring to the embodiment of FIGS. 1 and 2, it is shown with one example of a constant velocity document transport 10 on an exemplary copier 12. The transport 10 has a document transport roller unit 11 which moves individual original document sheets 14 in a constant velocity movement path over the transparent copying window or platen 16 of the copier 12, and then ejects the document 14 from the platen 16.

Since the copier 12 may be any of various known types, its example here is described only to the extent that the document handler 10 interfaces therewith. Here the document sheet 14 is preferably exposed on the platen 16 conventionally from under the platen by an illumination lamp 17 or lamps and a light reflector therefor. The image of that portion of the document thus uniformly illuminated which is within a viewing area or slit 18 in a central portion of platen 16 is conventionally focused onto the copier photoreceptor through a stationary lens 20 where the lens 20 is a self-focusing linear optical fiber array as described, for example, in U.S. Pat. No. 3,977,777. This flowing light image on the photoreceptor of the copier (not shown), may be conventionally developed and transfered to a registered copy sheet, as further described in the above-cited references.

The actual imaging or lens viewing area 18 here is only a minor central transverse strip area of the platen 16. Its boundaries are illustrated here by imaginary dashed lines 19 at the opposite sides thereof. It will be appreciated, as taught in the references cited above, that the lamp 17 and lens 20 may be permanently fixed or may be only temporarily locked in this position and otherwise movable to scan a full size platen contiguous or adjacent the area 18.

The side of the document parallel the direction of document motion may be initially registered against, and guided along, an edge guide 22. The initial registration of the lead edge of document to the other (orthogonal) axis, an imaginary line transverse the direction of document motion, can be done in several ways. Here it is accomplished simply by aligning (abutting) the lead edge of the document sheet with the initial stationary position of transport roller unit 11, that is, against the initial roller nip line 24, as shown in FIGS. 1 and 2. As discussed above, a lead edge detector switch may be activated as this is done to initiate the operation of both the document handler 10 and copier 12.

This initial transport of the document may be done manually or may be automatic, or assisted on by a registration aide system as shown in U.S. Pat. No. 4,257,587.

The transport 10 provides an improved CVT with no changes in driving torque or velocity while the document is being driven over the scan slit 18. The CVT 10 consists of a single and moving line nip from unit 11 which catches and overlies the lead edge of the document 14 upstream of (before) the document enters the scan slit 18. This single moving nip solely drives the document until the document trail edge as well as the moving nip have passed over the scan slit 18. The nip here is defined by two aligned rubber rolls 25 which only initially rub the platen glass itself and only upstream of the viewing area 18. The number of rollers 25 is not critical and may be one or more. A pair of fixed racks 26 engage pinions 28 on the unit 11 to make the unit 11 and its transport nip both rotate and linearly displace over the platen. Here a single common shaft 30 has a pinion gear 28 fixed at each end. Thus shaft 30 supports, translates, and rotates the rubber document feed rollers 25. The pinion gears 28 ride along, and have their rotation controlled by, the racks 26, causing both the gears and the roller nip to rotate counterclockwise in the document driving direction, as shown. The racks 26 are parallel to one another at opposite sides of the shaft 30 and the platen 16, and extend past the imaging area 18. The unit 11 nip grabs the lead edge of the document at initial location 24 upstream of the imaging area and releases and ejects the document trail edge at a downstream location 37 determined by the document length and while it is still moving, i.e. after the entire unit 11 has passed over and beyond the image area. The movement distance 33 of the unit 11 may therefor exceed this distance to position 32, and be a fixed distance determined by the drive system 35.

Note that the rollers 25 are over (holding down) the document centrally thereof and are overlying the imaging area 18 during imaging as well as transporting the document through the imaging station, but they are holding the document at a constantly changing position thereon.

The document and nip linear (translation) velocity relative to its driven rotational velocity can be preset by selecting the respective nip (roller radius) and gear diameters. An exemplary pinion gear 28 pitch diameter is 0.5" with a roller 25 nip diameter of 1.0", i.e. twice the gear pitch diameter. The total document velocity is equal to the linear roller surface nip velocity due to the shaft 30 rotation plus the nip translation velocity due to gear roll along the racks 26 and is therefore greater than either one individually.

The nip can be driven back and forth like a copier scan lamp or by various other known or suitable drive means 35. Here a conventional clutch 36, when actuated, connects a drive shaft 37 with cable pulleys to a conventional constant selected speed motor drive. The pulleys wind a wire or cable 38 which pulls and rotates the shaft 30 as shown by the movement arrows. The cable 38 may be wrapped around the shaft 30 as shown or otherwise. Return springs 40 can be used to automatically rapidly return the nip to initial position 24 with the drive disengaged.

A one-way clutch is also preferably used to allow free nip rotation for more than one revolution on the return movement, i.e. to allow the rollers 25 to roll back over the platen glass with no sliding or scuffing, disengaged from the drive and pinion gears. This may be a commercial wrap-spring clutch, for example, on the shaft 30 or, as here, inside the rollers 25. (See, e.g. U.S. Pat. No. 3,373,851 on such known clutch details).

Note that in both the start and end positions 24 and 32 of the roller unit 11 that the entire unit 11 is outside the field of view of the copier lens, i.e. spaced from one side of the imaging area 18 even though the rollers are still over the platen glass 16. During copying the document sheet 14 is always between the rollers 25 and the platen glass within the imaging area 18, both protecting the platen from scratching and providing a constant and lower driving torque. The rotation of the rollers 25 pulls the document sheet thereunder before the rollers reach the imaging area. There are no velocity changes while the entire document goes over the scan slit 18 because the same nip having the same driving torque is controlling the document movement at all times.

It will be appreciated that a conventional white document backing hold-down plate may closely overly the imaging area of the platen except in the areas of roller 25 movement to help hold the document sheet within the depth of field focus of the optical system, i.e. close to the platen glass.

It will be appreciated that the embodiments described herein are merely exemplary, and that other variations, modifications, refinements, or alternative embodiments may be provided by those skilled in the art. They are intended to be encompassed by the following claims:

What is claimed is:

1. In a document transport apparatus for transporting an original document sheet over the imaging station at a transparent platen of a copier, the improvement comprising:

integrally movable roller unit means adapted to drivingly engage a document sheet on said platen from an initial position upstream of said imaging station, and driving means to both rotate and translate said roller unit means relative to said platen and in engagement with a document sheet and so as to translate said roller unit means and a document sheet thereunder over and through said imaging station so that the roller unit means releases and ejects the document sheet trail edge downstream of said imaging station and after both said roller unit means and the document sheet have passed over and beyond said imaging station without imaging the roller unit or rubbing said transport platen with said roller unit in said imaging station and wherein said rotational movement of said roller unit means advances the lead edge of a document ahead of it before it enters the imaging station.

2. The apparatus of claim 1 wherein said integral roller unit means provides a single nip line roller engagement with a document sheet which is the only driving force on a document sheet in said imaging station.

3. The apparatus of claim 1 wherein said driving means includes means to reciprocate said roller unit means from and back to said initial position.

4. The apparatus of claims 1, 2 or 3 wherein said driving means comprises fixed rack means extending past said imaging station in the document movement direction and pinion gear means rotatably engaging said rack means and rotatably connecting with said roller unit means and means to drive said roller unit means.

5. The apparatus of claim 4 wherein said roller unit means comprises a single shaft with aligned rubber rollers thereon.

6. The apparatus of claims 1, 2 or 3 wherein said roller unit means comprises a single shaft with aligned rubber rollers thereon and pinion gears thereon.

7. The apparatus of claims 1, 2 or 3 wherein said roller unit means has one way clutch means to allow free reverse rotation thereof in non-slip engagement with said platen on a return movement to said initial portion.

8. The apparatus of claim 4 wherein said roller unit means has one way clutch means to allow free reverse rotation thereof in non-slip engagement with said platen on a return movement to said initial position.

* * * * *